No. 882,717. PATENTED MAR. 24, 1908.
E. M. SCHOLLENBERGER.
COMBINED TROLLEY WHEEL AND SLEET CUTTER.
APPLICATION FILED OCT. 30, 1907.

Witnesses:

Inventor:
E. M. Schollenberger
by Brown & Hoffman
Attys

UNITED STATES PATENT OFFICE.

EDMUND M. SCHOLLENBERGER, OF CHICAGO, ILLINOIS, ASSIGNOR OF ONE-HALF TO AUGUST C. BERWANGER, OF CHICAGO, ILLINOIS.

COMBINED TROLLEY-WHEEL AND SLEET-CUTTER.

No. 882,717.　　　　Specification of Letters Patent.　　　Patented March 24, 1908.

Application filed October 30, 1907. Serial No. 399,903.

*To all whom it may concern:*

Be it known that I, EDMUND M. SCHOLLENBERGER, a citizen of the United States, residing at Chicago, in the county of Cook and State of Illinois, have invented certain new and useful Improvements in Combined Trolley-Wheels and Sleet-Cutters, of which the following is a specification.

This invention relates to improvements in combined trolley wheels and sleet cutters and the object of the same is to provide a simple, durable and cheap device of this character adapted to cut or break the sleet from the conducting wire, and at the same time permit the trolley wheel to follow the irregularity of the conducting wire.

To the attainment of these ends and the accomplishment of other new and useful objects, as will appear, the invention consists in the features of novelty in the construction, combination and arrangement of the several parts hereinafter more fully described and claimed and shown in the accompanying drawing illustrating an exemplification of the invention, and in which—

Figure 1:
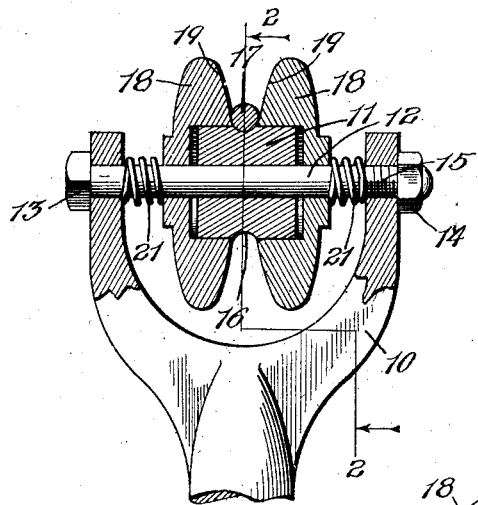
Figure 3:
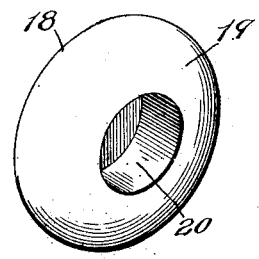
Figure 2:
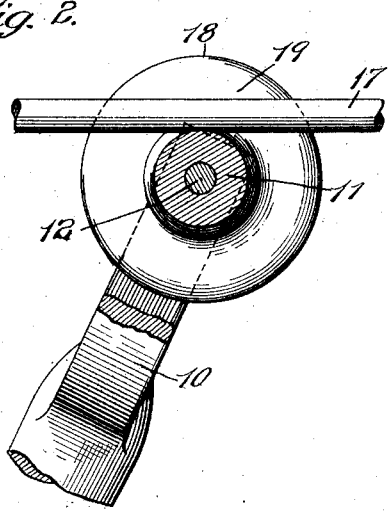
Figure 4:
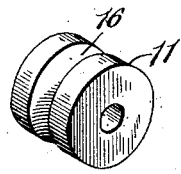

Figure 1 is a detail sectional view of an improved device of this character constructed in accordance with the principles of this invention. Fig. 2 is a detail sectional view on line 2—2 of Fig. 1. Fig. 3 is a detail perspective view of one of the side members or sleet cutters. Fig. 4 is a detail perspective view of the trolley wheel proper or central member.

Referring more particularly to the drawing and in the present exemplification of the invention, the numeral 10 designates the ordinary trolley harp and 11 designates the central member of the trolley wheel, which is journaled upon a suitable axle 12 extending across the trolley harp and which latter is held against displacement by means of a head 13 on one end thereof engaging the outer face of one of the arms of the harp, and a nut 14 engaging the threaded extremity 15 of the axle and resting against the outer face of the other arm of the trolley harp. The central member or trolley wheel proper 11 is provided with a peripheral groove 16 and is adapted to move longitudinally on the axle 12 to permit the trolley wheel to follow the conductor wire 17.

Rotatably mounted upon the axle 12 are side members or flanges 18 which are of a larger diameter than the diameter of the central member 11 and are preferably in the form of disks, the adjacent faces of which taper from the periphery of the central member 12 towards the periphery of the side members. Each of these side members 18 is provided with a central recess 20 which is of a diameter slightly larger than the diameter of the central member 11 and is adapted to receive one extremity of the central member so that when the extremities of the central member are located in the recess 20, the inclined faces 19 of the side members will form a continuation of the peripheral groove 16 to form a V-shaped slot between the side members 18 to permit the conductor wire to be readily seated in the peripheral groove.

Disposed between the outer face of the side members 18 and the respective arms of the trolley harp 10 are suitable yielding members 21, such as springs or the like, which are preferably coiled about the axle 12 and serve as means for holding the side members 18 adjacent each other so that when the central member 11 engages the conductor wire 17, the yielding members or springs 21 will be placed under tension to cause the faces 19 of the side members 18 to grip the conductor wire so that as the trolley is advanced along the conductor, the side members 18 will rotate with the central member and crack or crush the sleet from the conductor wire. The tension exerted by the yielding members 21 will also serve to cause the side members 18 to grip the conductor wire 17 to prevent accidental displacement of the trolley with relation to the conductor wire.

When the conductor wire 17 is disposed between the side members 18, the latter will be displaced laterally with relation to the central member 11 and the yielding members 21 will permit the central member 11 together with the side members 18 to move longitudinally on the axle 12 to permit the trolley wheel to follow the conductor wire 17.

In order that the invention might be fully understood by those skilled in the art, the details of the foregoing embodiment thereof have been thus specifically described, but

What I claim as new and desire to secure by Letters Patent is—

A combined trolley wheel and sleet cutter comprising an axle, a central member longitudinally adjustable on the axle, end members of a diameter larger than the diameter of the central member and laterally adjustable with relation thereto and longitudinally adjustable on the axle, said end members being provided with a recess in the adjacent faces thereof to receive the respective extremities of the central member, and yielding means for holding the end members in position with respect to the central member and to cause the members to grip the conductor wire, said members being adapted to be adjusted in either direction substantially the entire length of the axle.

In testimony whereof I have signed my name to this specification, in the presence of two subscribing witnesses, on this 24th day of October A. D. 1907.

EDMUND M. SCHOLLENBERGER.

Witnesses:
J. H. JOCHUM, Jr.,
M. W. CANTWELL.